(12) United States Patent
Sharifi Mehr

(10) Patent No.: US 10,860,382 B1
(45) Date of Patent: Dec. 8, 2020

(54) RESOURCE PROTECTION USING METRIC-BASED ACCESS CONTROL POLICIES

(71) Applicant: Amazon Technologies, Inc., Seattle, WA (US)

(72) Inventor: Nima Sharifi Mehr, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 318 days.

(21) Appl. No.: 15/688,562

(22) Filed: Aug. 28, 2017

(51) Int. Cl.
  *G06F 9/50* (2006.01)
  *G06F 21/62* (2013.01)
  *H04L 12/911* (2013.01)
  *H04L 29/06* (2006.01)

(52) U.S. Cl.
  CPC ............ *G06F 9/5038* (2013.01); *G06F 21/62* (2013.01); *H04L 47/70* (2013.01); *H04L 63/102* (2013.01)

(58) Field of Classification Search
  CPC ....... G06F 9/5038; G06F 21/62; H04L 47/70; H04L 63/102
  See application file for complete search history.

(56) References Cited

U.S. PATENT DOCUMENTS

| | | | | |
|---|---|---|---|---|
| 9,749,319 | B2 * | 8/2017 | Serebrin | G06F 12/1475 |
| 2006/0106938 | A1 * | 5/2006 | Dini | H04L 67/1002 |
| | | | | 709/228 |
| 2007/0234410 | A1 * | 10/2007 | Geller | G06Q 20/3821 |
| | | | | 726/8 |
| 2011/0276604 | A1 * | 11/2011 | Hom | G06F 21/552 |
| | | | | 707/802 |
| 2013/0347018 | A1 * | 12/2013 | Limp | H04N 21/4826 |
| | | | | 725/19 |
| 2014/0282831 | A1 * | 9/2014 | Pedroza | H04L 63/20 |
| | | | | 726/1 |
| 2016/0147902 | A1 * | 5/2016 | Katakawa | G06F 12/0862 |
| | | | | 707/722 |
| 2017/0230391 | A1 * | 8/2017 | Ferguson | G06N 5/022 |
| 2018/0097788 | A1 * | 4/2018 | Murthy | H04L 63/0227 |
| 2018/0309754 | A1 * | 10/2018 | Magadevan | H04W 12/0027 |
| 2018/0330257 | A1 * | 11/2018 | Dodson | G06N 7/005 |

OTHER PUBLICATIONS

Waleed W. Smari et al., "A extended attribute based access control model with trust and privacy: Application to a collaborative crisis management system," 2014, pp. 147-168. (Year: 2014).*

Thang Bui et al., "Greedy and Evolutionary Algorithms for Mining Relationship-Based Access Control Policies," Aug. 23, 2018, pp. 1-27. (Year: 2018).*

* cited by examiner

*Primary Examiner* — Luu T Pham
*Assistant Examiner* — Canh Le
(74) *Attorney, Agent, or Firm* — Nicholson De Vos Webster & Elliott, LLP

(57) ABSTRACT

Techniques for resource protection using metric-based access control policies are described. A policy enforcement service receives a request involving a resource, and determines a dynamic metric value for the resource. The dynamic metric value is generated via a monitoring of one or more resources. The one or more resources may include the resource. Responsive to a determination that the dynamic metric value does not satisfy a dynamic metric condition of a policy defined by a user for the resource, the policy enforcement service performs one or more security actions related to the request. The dynamic metric condition was configured by the user.

14 Claims, 9 Drawing Sheets

RESOURCE PROTECTION USING METRIC-BASED ACCESS CONTROL POLICIES

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to provide those services is dynamically scalable to meet the needs of the services at any given time. A user or customer often will rent, lease, or otherwise pay for access to resources through the cloud, and thus does not have to purchase and maintain the underlying hardware and/or software.

In this context, many service providers utilize virtualization and multi-tenant architectures to allow multiple users to share its underlying hardware and/or software resources. Virtualization allows server end stations, storage devices, or other hardware resources to be partitioned into multiple isolated instances that can be assigned to and used by different users. Thus, multiple users can utilize the service provider's resources at a time.

BRIEF DESCRIPTION OF DRAWINGS

Various embodiments in accordance with the present disclosure will be described with reference to the drawings, in which.

DETAILED DESCRIPTION

Figure 1:
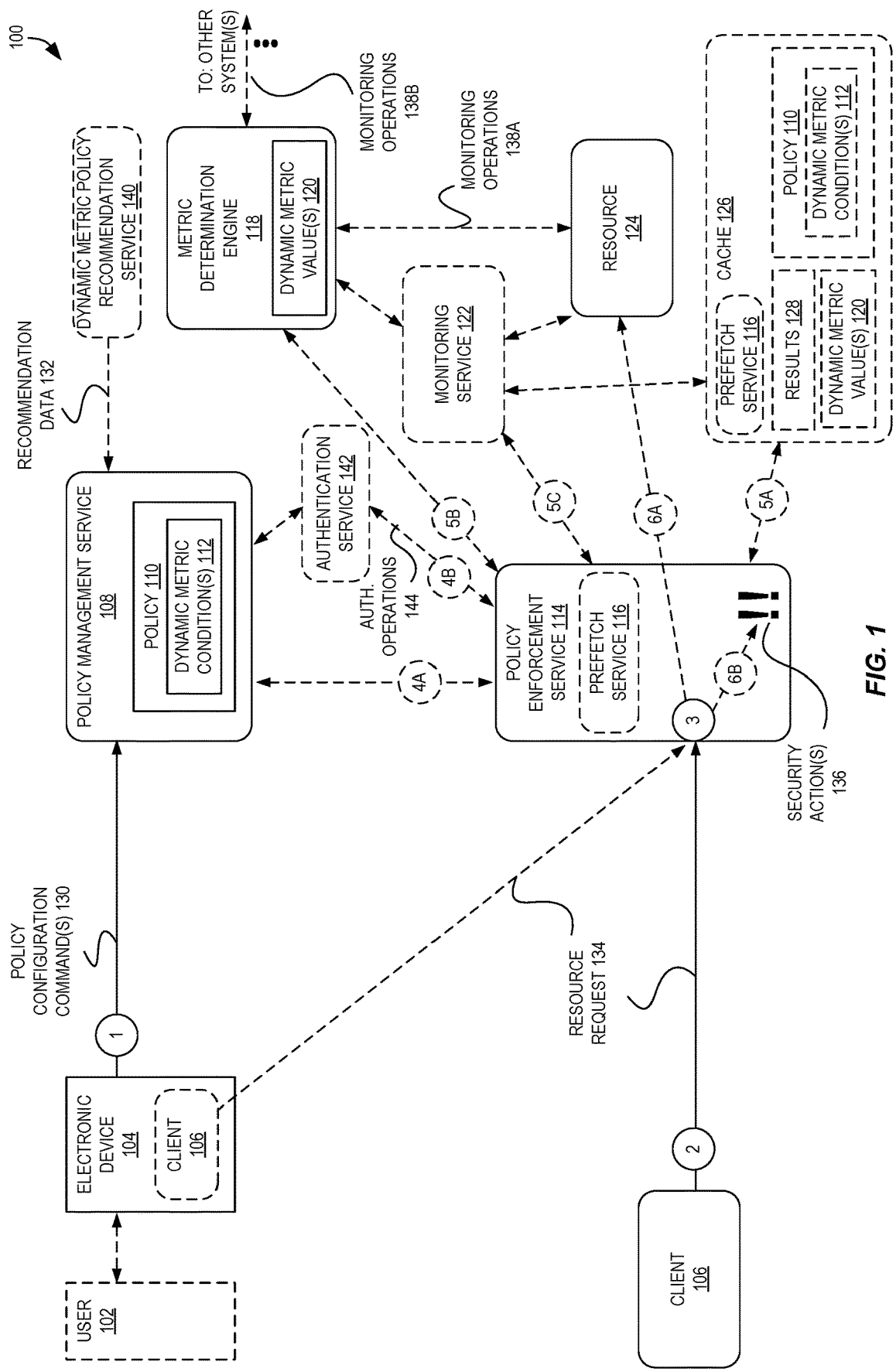
FIG. 1 is a block diagram illustrating an environment utilizing a metric-based access control policy for resource protection according to some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Some service providers allow users to utilize one or more of a variety of types of services. For example, a user may utilize services of the service provider to execute virtual machines (VMs), store and/or retrieve files, host a website, execute code or an application, implement and/or use a database, create a virtual network, etc.

For many users, for these types of resources to be of value, it is important to be able to control how their resources (e.g., compute instances, storage repositories, data, applications, databases, network nodes such as routers, gateways, or switches, etc.) are able to be accessed (e.g., queried, updated, modified, terminated, etc.). For example, an organization may wish to store or operate upon sensitive data (e.g., personally-identifying data, financial data, business secrets) using a service, and thus it may be crucial for the organization to be able to stop others from being able to access that sensitive data.

One technique for controlling access to resources uses user-defined policies which specify how associated resources are to be accessed. For example, a common policy involves requiring a user authentication to be performed before a resource can be accessed, such as by requiring a user to provide a username and password. As another example, a policy could be configured so that accesses to a particular resource would be allowed only for requests coming from a particular network address or range of network addresses—e.g., an address (or address block) of that user's organization. Such policies can be defined for a variety of levels of granularity—e.g., implemented for a subset of a resource, such as a particular table or row of a database. Some policies can also be defined using date and/or time restrictions—e.g., limiting access to a resource to particular days of the week, and/or particular hours of the day.

As beneficial as these types of access policies are, these polices cannot account for certain changes in any of a variety of conditions. For example, particular users may wish to restrict access to certain resources under certain operating conditions—e.g., during times of high system load, in order to maintain a high quality-of-service or prevent the resource from being operationally disrupted.

Accordingly, embodiments for resource protection using metric-based access control policies are described. In some embodiments a policy for a resource that controls access to that resource based on the value of a dynamic metric value is configurable. The policy includes a dynamic metric condition, based on a dynamic metric value, that must be satisfied to allow a request involving (or "targeting") the resource to be fulfilled. The dynamic metric value can be a variety of types of values, including but not limited to integers, real numbers, percentages, booleans, alphanumeric values, enumerated types (e.g., low or medium or high, red or yellow or green), etc., that can indicate a variety of types of conditions. For example, in some embodiments the dynamic metric value indicates an amount of anomalous behavior detected regarding the resource (or another resource) by a metric determination engine. As another example, the dynamic metric value can indicate a current or recent utilization associated the resource (or an aspect thereof), such as an amount of processor or memory or storage utilization, etc. When a dynamic metric condition for a resource is not satisfied at the time of a request, one or more security actions can be performed, such as blocking the request from being fulfilled, notifying an administrator or other user, causing a multi-factor authentication process to be enabled, etc.

In some embodiments, a user 102 is provided one or multiple suggested dynamic metric conditions, generated by a dynamic metric policy recommendation service 140, that can be used to control access to a resource. The dynamic metric policy recommendation service 140 performs an analysis of historic dynamic metric values—of that particular resource, similar resources, etc.—to determine what dynamic metric condition might be useful for the user 102 for controlling access to the resource 124. For example, a number of dynamic metric values observed during a "normal" operational period for the resource are identified, and a dynamic metric condition is determined and suggested to the user, where the dynamic metric condition would be satisfied (or not satisfied) when a current dynamic metric value under consideration is larger or smaller than any of the identified historic dynamic metric values—thus being "triggered" when an atypically large or small dynamic metric value is seen.

In some embodiments, the dynamic metric policy recommendation service 140 determines and provides, along with one or more different dynamic metric conditions, indicators of the likely result of applying the one or more different dynamic metric conditions. For example, in some embodiments, the dynamic metric policy recommendation service 140 determines a dynamic metric condition that, over a recent period of time, would have not been satisfied a particular number (or percentage) of times. The dynamic metric policy recommendation service 140 can suggest such a dynamic metric condition and indicate this condition would likely have been not satisfied a number of times in the past amount of time, and/or a percentage of requests over the past amount of time that would have not satisfied the condition, etc. In some embodiments, the dynamic metric policy recommendation service 140 determines an anticipated and/or historic satisfaction (or non-satisfaction) rate for a particular dynamic metric condition responsive to a configuration a particular dynamic metric condition, thus enabling the user to quickly and easily understand what the likely effect of the policy will be.

For a particular request involving the resource, the dynamic metric value can be obtained in a variety of ways. For example, the dynamic metric value can be provided along with the request (e.g., within a header field of the request) or obtained by a service implementing the policy (e.g., policy enforcement service 114). This service can obtain the dynamic metric value on a request-by-request basis, cache dynamic metric values or the result of the dynamic metric condition of the policy (for re-use for subsequent requests for a period of time), or even pre-fetch dynamic metric values in anticipation of a need to evaluate a dynamic metric condition for (predicted) upcoming requests involving the resource.

Accordingly, embodiments provide for customizable policies based on dynamic metric values—in contrast to service provider-wide policies, or polices based on statically-defined data/conditions—to thereby provide users the ability to implement flexible access controls that can be specifically-tuned to the particular resources involved. Thus, a variety of technical benefits result depending upon the implementation, including but not limited to reduced system stress (e.g., reduced memory, processing, and/or network load due to resources not being overloaded), the protection of resources against system attacks, etc.

FIG. 1 is a block diagram illustrating an environment 100 utilizing a metric-based access control policy for resource protection according to some embodiments. The system 100 includes a policy enforcement service 114 that uses a dynamic metric value 120 that is part of a dynamic metric condition 112 of a policy 110 to control access to a resource 124.

In some embodiments, the policy 110—and specifically, the dynamic metric condition(s) 112—is configured (e.g., by a user 102) to be applied for the resource 124. The user 102 may be a person operating for the benefit of (or otherwise associated with) an entity (e.g., a business, organization, governmental body, or other collective body), though the user 102 can also be an individual with no such affiliations.

The user 102 may use an electronic device 104 (e.g., a client end station, server end station) to cause the electronic device 104, at circle '1', to issue one or more policy configuration commands 130 to a policy management service 108. For example, the user 102 may utilize the electronic device 104 to view a website or application providing a portal that allows the user 102 to manage or control one or more resources 124 provided by a service provider system. For example, the user 102 may interact with the website or application (e.g., using some sort of user input/output component of the electronic device 104) to launch, modify/configure, or terminate a resource 124 such as a virtual machine (VM) instance, virtual network, storage application, etc., or to manage the resource(s) 124 of the user by, for example, configuring a policy that indicates how access to the resource(s) 124 is to be controlled. In the case the user 102 is attempting to configure (add, remove, modify, etc.) such an access policy, the electronic device 104 transmits policy configuration commands 130 to the policy management service 108.

The policy configuration commands 130 can be of a variety of formats and types based on the particular implementation of the policy management service 108 and/or service provider system. For example, in some embodiments the policy configuration commands 130 are HyperText Transfer Protocol (HTTP) request messages sent to an Application Programming Interface (API) endpoint of a service provider's system, though many other types of commands can be utilized that are well-known to those of skill in the art. In some embodiments using an API, the API is a REpresentational State Transfer (REST) (or "RESTful")

service and thus the policy configuration commands 130 may adhere to a set of uniform, predefined stateless operations.

Upon receipt of the policy configuration command(s) 130, the policy management service 108 causes the policy 110 to be enabled to control "access" to the resource 124 (e.g., use of the resource, management of the resource, etc.), which can include storing the policy 110 on/in a storage medium, providing the policy 110 to other entities within the service provider system, etc.

The policy configuration command(s) 130, at circle '1', may also be sent by the electronic device 104 without any immediate user 102 input/control—e.g., according to instructions of an application that it executes. However, the electronic device 104 may still be operating for the benefit of (or under the control of) the user 102.

In some embodiments, the user 102 (or electronic device 104) is able to define a policy 110 including one or more dynamic metric conditions 112. For example, a user 102 may define a policy including one or more policy statements. A policy statement is used by the policy enforcement service 114 to allow or deny access to some service(s) or resource(s), and can be attached to one or more users, groups of users, or user roles. For example, a policy statement could be attached to a first user and indicate that this user has permission to perform a particular action (e.g., modify a compute instance, query a database) for a particular resource.

Figure 2:
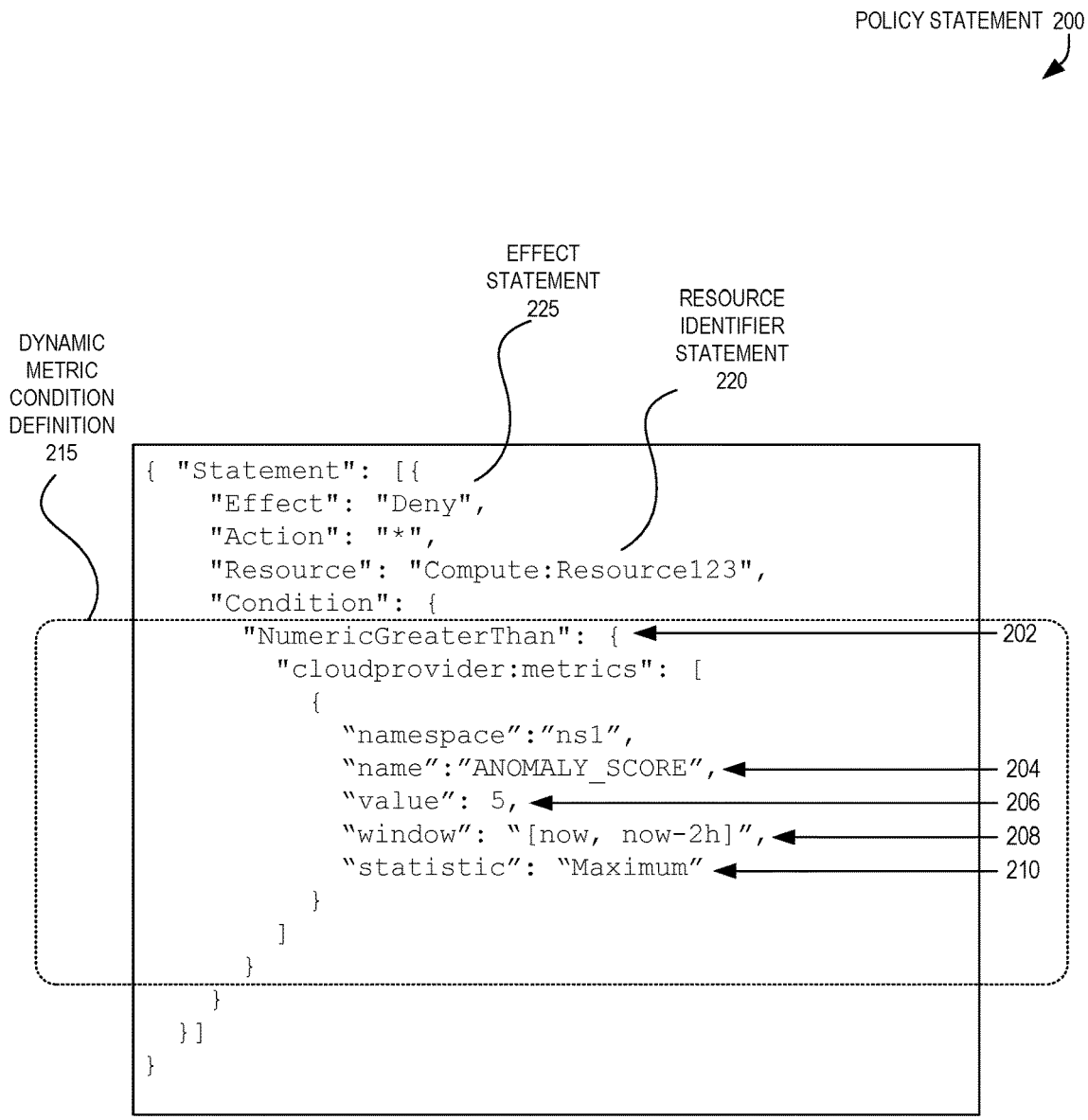
FIG. 2 is a diagram illustrating a dynamic metric condition definition of an exemplary policy statement according to some embodiments.

One exemplary policy statement 200 is shown in FIG. 2, which is a diagram illustrating one dynamic metric condition definition 215 of an exemplary policy statement 200 according to some embodiments, though in some embodiments a policy can have multiple policy statements 200. This policy statement 200 includes a resource identifier statement 220 that indicates that, for a particular "compute" resource (e.g., a set of VMs) with a name of "Resource123", access is to be denied (per effect statement 225 indicating "deny", as opposed to "allow," etc.) when a particular dynamic metric condition is determined to be satisfied. This dynamic metric condition is reflected in the dynamic metric condition definition 215 portion of the policy statement 200, which indicates that the condition is met—and thus, access to the resource is denied—when a maximum (per statistic 210) dynamic metric value (by the name 204 of "ANOMALY_SCORE") from the past two hours (per window 208) is greater than (per condition type 202) a value 206 of "5". This illustrated policy statement 200 and dynamic metric condition definition 215 provide one simple example, and many variations from this example can be utilized in different scenarios and embodiments—e.g., using only some of these illustrated elements of the policy, and/or different effect statements 225 (allow, deny, etc.), different actions (e.g., specific access request commands), different resources, different condition types 202 (StringEquals, NumericLessThan, Bool, BinaryEquals, etc.), different dynamic metric names 204, different namespaces, different values 206 (e.g., integers, real numbers, alphanumerics, ranges, Boolean values), different windows 208, and/or different statistics 210.

In this example, the involved dynamic metric value 120 represents a particular metric that is generated by some entity based on monitoring some resource (e.g., the "protected" resource 124). For example, with reference to FIG. 1, the dynamic metric value 120 could be generated by a metric determination engine 118 based on monitoring operations 138A (of the resource 124) or monitoring operations 138B (of other non-illustrated systems/resources). A metric determination engine 118 can be, for example, an anomaly detection system, an intrusion detection system, a monitoring/alarming system, etc. In this example, the dynamic metric value 120 has the name 204 of ANOMALY_SCORE and is a numeric value indicating an amount of anomalous activity regarding the resource 124 that is observed by the metric determination engine 118. For example, the metric determination engine 118 monitors traffic (e.g., access requests or "resource requests") that is destined to or arrives at the resource 124 to detect anomalous activity. Anomalous activity may include traffic that is suspicious—e.g., includes likely fraudulent or malicious information/data, departs in some manner from established "normal" traffic (as seen by the particular resource 124 or across multiple resources), etc.

After the one or more policy configuration command(s) 130 have been received and processed by the policy management service 108, a client 106 at circle '2' may transmit a resource request 134 to access a resource 124 that is received by the policy enforcement service 114. The client 106 may be a software module (e.g., of an application), and may be executed by the electronic device 104 of the user 102, by another electronic device of the user's organization, by an electronic device of the service provider system, etc. The resource request 134 can be of a variety of types/formats selected based on the particular implementation of the service provider system. For example, the resource request 134 could include one or more HTTP request messages sent to an API endpoint of the service provider system, which can be according to a RESTful API. In some embodiments, the policy configuration commands 130 and the resource request 134 may be sent to a same API endpoint of the service provider system, though in some embodiments the policy configuration commands 130 and the resource request 134 are sent to different API endpoints.

Upon receipt of the resource request 134 at circle '3', the policy enforcement service 114 determines whether the resource request 134 is allowed to access the resource 124 (i.e., be "served" or "fulfilled") according to the one or more condition(s)—including the dynamic metric condition(s) 112—set forth by the policy 110. This determination can be part of a set of authorization operations performed by the service provider system, which may or may not occur along with a set of authentication operations.

For example, the resource request 134 may be analyzed according to a set of authentication operations 144 including determining whether the request 134 includes a valid signature. In some embodiments, a resource request 134 includes a signature that has been generated by the client 106 by encrypting (or otherwise transforming) a part of the request using a key. For example, the signature could be generated by applying a transformation function (e.g., a Hash Message Authentication Code (HMAC) algorithm) using at least a part of the request.

A component (e.g., authentication service 142) of the service provider's system then likewise generates a reference signature by identifying a user that appears to have sent the message (e.g., using a source network address, a user identifier sent in the request, etc.), identifying a key associated with that user (e.g., stored by the service provider system, perhaps in a secure key storage), and encrypting/transforming the same part of the request using the stored key. When the resulting reference signature matches the provided signature of the resource request 134, the authentication service 142 can determine that the resource request 134 was authentically generated by the correct key, and otherwise may conclude that the resource request 134 was not authentically generated by the correct key—which can result in the policy enforcement service 114 denying the request, etc. In some embodiments, this type or similar types of pre-shared key authentication techniques may be utilized as part of authentication operations 144, though other embodiments can use other techniques known to those of skill in the art, e.g., verifying usernames/passwords, performing multi-factor authentication (MFA), etc.

As indicated above, the service provider's system—e.g., the policy enforcement service 114—may determine whether the policy 110 including the dynamic metric condition(s) 112 allows the resource request 134 to be fulfilled. This can include obtaining the policy 110 (shown at circle '4A' or '4B') and obtaining one or more dynamic metric value(s) 120 (at one or more of circles '5A', '5B', and '5C').

For example, in some embodiments, the policy enforcement service 114, responsive to receipt of the resource request 134, obtains the policy 110 at circle '4A' or '4B.' This can include requesting and receiving the policy from the policy management service 108 at circle '4A', accessing a policy storage location (not illustrated), etc., to identify and obtain policies associated with the requesting user 102 and/or the resource 124, obtaining the policy 110 from an authentication service 142 as part of performing authentication operations 144 for the resource request 134, etc.

The policy enforcement service 114, in some embodiments, also obtains one or more dynamic metric value(s) 120 (e.g., responsive to determining the need for such values by scanning through the policy 110), which can include at circle '5B' requesting and/or receiving the dynamic metric value(s) 120 from the metric determination engine 118, or at circle '5C' requesting and/or receiving the dynamic metric value(s) 120 from a monitoring service 122. In some embodiments, a monitoring service 122 of the service provider system is a logically centralized entity that collects and tracks metrics, or collects and monitors log files, etc., for resources 124 within the service provider's system. Thus, the metric determination engine 118 may periodically provide updated dynamic metric value(s) 120 to the monitoring service 122, from which the policy enforcement service 114 may obtain them at circle '5C'.

With the policy 110 and the dynamic metric value(s) 120, the policy enforcement service 114 evaluates the conditions of the policy 110—including the dynamic metric condition(s) 112. Using the example of FIG. 2, the dynamic metric value(s) 120 may include a value of an "anomaly score", and the policy enforcement service 114 can determine whether the value of this anomaly score is greater than the value 206 (e.g., "5") of the policy. If not, the dynamic metric condition 112 is said to have been met—i.e., the dynamic metric condition 112 will not prevent the resource request 134 from being fulfilled by the resource 124 at circle '6A'. For example, in a scenario where the resource 124 is a collection of data objects or repositories provided by a data service and the request is seeking to retrieve (or otherwise access) a data object or repository, the resource request 134 may be provided to the data service to be served. As another example, the resource 124 could be a compute instance of a compute service and the resource request 134 may be a request to terminate the compute instance, in which case the resource request 134 can be provided to the compute service that can perform the termination. When the dynamic metric condition 112 has not been met, the policy enforcement service 114 can perform one or more security actions 136 at circle '6B.'

Additionally or alternatively, the policy enforcement service 114 may access a cache 126 to determine whether the policy 110, dynamic metric condition(s) 112, and/or results 128 of previous policy evaluations, as illustrated at circle '5A'. For example, the policy enforcement service 114 may access the cache 126 to determine whether it includes a valid (or recent) version of the dynamic metric value(s) 120, in which case the policy enforcement service 114 need not acquire dynamic metric value(s) 120 via other routes (e.g., circle '5B' or '5C'). As another example, the policy enforcement service 114 may access the cache 126 to determine whether it includes a copy of the policy 110, in which case it need not obtain the policy 110 at circle '4' from the policy management service 108. As yet another example, the policy enforcement service 114 may access the cache 126 to determine whether a result 128 of the policy 110 being previously evaluated exists; if so, the policy enforcement service 114 may be able to bypass obtaining the policy 110 and/or dynamic metric value(s) 120 (at circle '4' and/or circle '5B' or '5C'). Thus, in some embodiments, upon evaluating a policy 110, the policy enforcement service 114 is configured to store the result 128 of the evaluation, and/or the dynamic metric value(s) 120, and/or the policy 110 in the cache 126.

One or more cache invalidation schemes may be utilized to manage the cache 126. For example, the cache 126 may utilize time-to-live (TTL) values to determine when to invalidate or evict a result 128, dynamic metric value(s) 120, and/or policy 110. Such TTL values can be set system-wide, set by the user 102, set based on the particular policy 110, etc. For example, in some embodiments a TTL value is set based on the dynamic metric condition 112—e.g., the window 208 (equal to 2 hours in FIG. 2) can be used to indicate that a result 128 of that policy 110, the dynamic metric value(s) 120, and/or the policy 110 itself will stay valid in the cache 126 for a particular amount of time (e.g., 2 hours).

Additionally, in some embodiments the policy enforcement service 114 further includes a prefetch service 116 that pre-fetches the dynamic metric value(s) 120 and/or policy 110—e.g., without being triggered by a particular resource request 134. For example, the prefetch service 116 can analyze previous resource request 134 patterns to identify that particular dynamic metric value(s) 120 or policies 110 will likely be needed at a particular date or time, and obtain this data so that it is available to the policy enforcement service 114—e.g., within the cache 126—at that particular date or time. In some embodiments, the prefetch service 116 is alternatively located within the cache 126 (e.g., as part of a non-illustrated cache controller) to similarly retrieve dynamic metric value(s) 120 or policies 110 in advance of the anticipated need for this data.

As indicated above, in response to a dynamic metric condition 112 not being met for a resource request 134, the policy enforcement service 114 can perform one or more security actions 136 at circle '6B.' The security action(s) 136 can be set uniformly across the service provider's system, set or customized by the user 102, etc. For example, the security action(s) 136 can include one—or multiple—actions such as blocking the request 134 from being fulfilled by the resource 124, notifying the user 102 (or another entity indicated by the user 102), notifying the client 106 (e.g., sending a response to the request indicating that the request is denied/etc.), causing a multi-factor authentication process to be enabled for the client 106 (and/or other possible clients), increasing or enabling certain security controls (not illustrated) for the resource 124, increasing or modifying monitoring operations 138A or logging involving the resource 124, etc. In some embodiments, the action(s) 136 may even include allowing the resource request 134 to be fulfilled, though often in this case other actions 136 may also be performed, such as increasing security, logging, etc.

Figure 3:
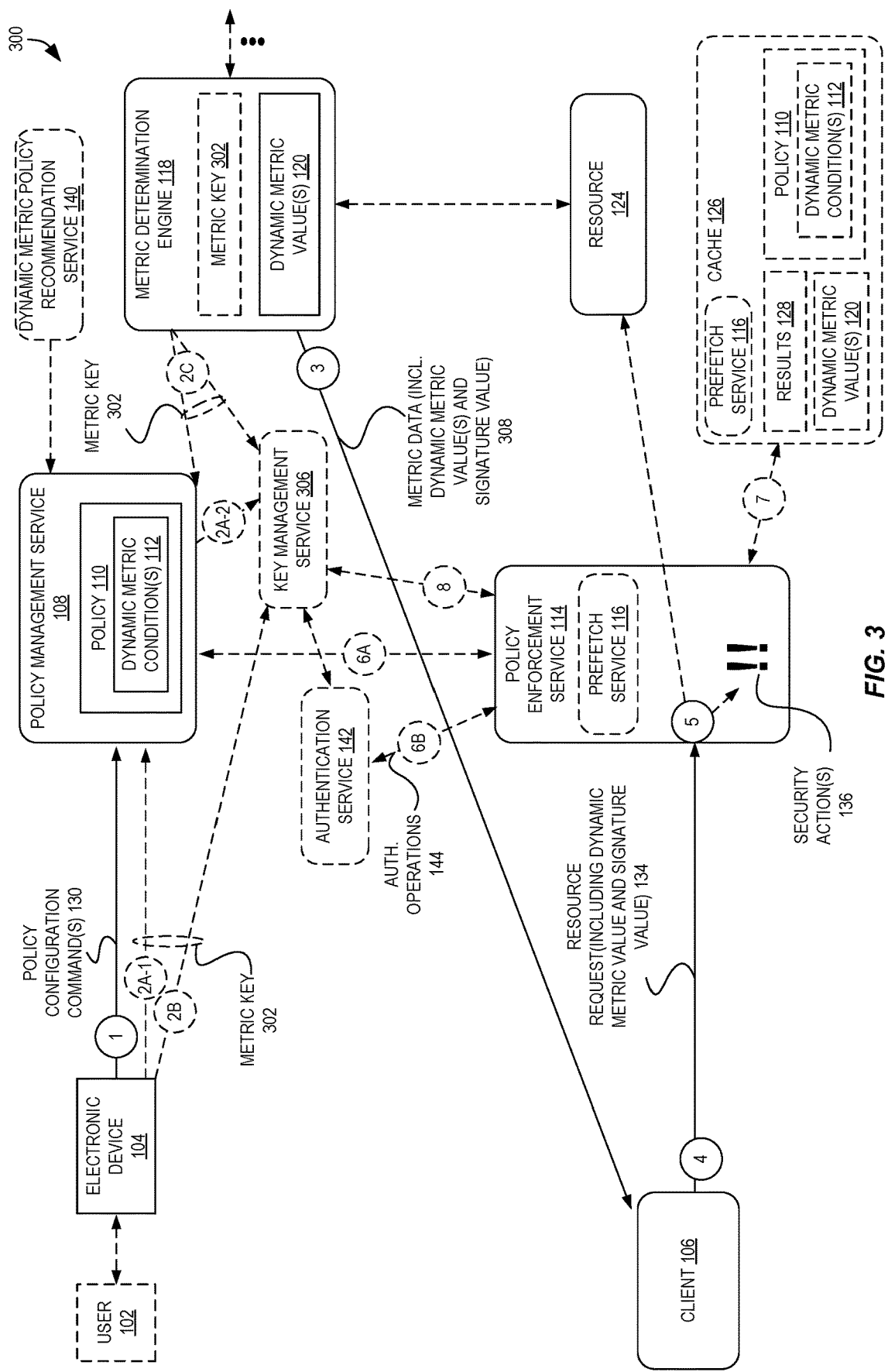
FIG. 3 is a block diagram illustrating an environment utilizing a metric-based access control policy for resource protection with client-provided dynamic metric value data according to some embodiments.

Thus, FIG. 1 illustrates an environment 100 where a policy enforcement service 114 can obtain dynamic metric value(s) 120 for evaluating a policy 110 having one or more dynamic metric condition(s) 112. Another configuration can also be utilized and is shown in FIG. 3. FIG. 3 is a block diagram illustrating an environment 300 utilizing metric-based access control policies for resource protection with client-provided dynamic metric value data according to some embodiments. In this illustrated example, it is the client 106 that provides the dynamic metric value(s) 120 to the policy enforcement service 114, instead of the policy enforcement service 114 obtaining the dynamic metric value(s) 120 on its own. Such a configuration can be beneficial in a variety of settings, such as when the metric determination engine 118 is not a part of the service provider system and thus the policy enforcement service 114 may not have access to it, when the service provider system desires to reduce its "server-side" processing by offloading the dynamic metric value(s) 120 acquisition process to the requesting clients 106, etc. Moreover, some embodiments utilize a "hybrid" configuration by including aspects of FIG. 1 and FIG. 3. For example, some embodiments utilize policy enforcement service-obtained dynamic metric value(s) for some requests (or some users) as well as client-provided dynamic metric value(s) for other requests (or users). For example, some embodiments, the policy enforcement service identifies whether (legitimate) dynamic metric value(s) are provided with a request and if so, uses those dynamic metric value(s) for policy evaluation; however, if a necessary dynamic metric value is not provided (or if one is provided that is determined to be illegitimate, as described below), the policy enforcement service obtains the dynamic metric value(s) on its own. As another example, some embodiments utilize client-provided dynamic metric value(s) for requests from a first set of users, and utilize policy enforcement service-obtained dynamic metric value(s) for a second set of users. Thus, embodiments can flexibly accommodate different usage scenarios and user needs.

In some cases, it is beneficial that the policy enforcement service 114 can verify that such a client-provided dynamic metric value(s) 120 is legitimate/authentic. For example, it could be the case that a client 106—or an actor seeking to impersonate the client 106—may seek to forge this data to illegitimately gain access to the resource 124. In some embodiments, the policy enforcement service 144 can cause a legitimacy check using cryptographic (or similar) techniques to be performed.

As shown in FIG. 3, in addition to sending policy configuration commands 130, the electronic device 104 may also provide, at circle '2A-1', a metric key 302 to the policy management service 108, which can provide the metric key 302 to a key management service 306 at circle '2A-2'. Alternatively, the electronic device 104 can provide the metric key 302 at circle '2B' directly to the key management service 306, or have the metric determination engine 118 provide the metric key 302 at circle '2C.' The metric key 302 can be a value used, by the metric determination engine 118, to create a signature for a dynamic metric value(s) 120 and/or to encrypt the dynamic metric value(s) 120 (such as when the dynamic metric value(s) 120 is not to be exposed to the client 106).

At circle '3', the metric determination engine 118 provides metric data 308 to the client 106, which can include the dynamic metric value(s) 120 and a signature value for the dynamic metric value(s) 120, or just include an encrypted form of the dynamic metric value(s) 120. At circle '4', the client 106 then sends a resource request 134 that includes the dynamic metric value(s) 120 and signature (or just the encrypted dynamic metric value(s) 120).

Upon the policy enforcement service 114 receiving the resource request 134 at circle '5', the policy enforcement service 114 can optionally access a cache 126 and/or obtain the policy (at circle '6A' or '6B') as described above with regard to FIG. 1. However, the policy enforcement service 114 uses the provided dynamic metric value(s) 120 without needing to directly obtain the provided dynamic metric value(s) from the metric determination engine 118.

For example, in some embodiments where the dynamic metric value(s) 120 are sent with a signature, the policy enforcement service 114 at circle '8' interacts with the key management service 306 to obtain the metric key 302 and determine whether the signature is valid (as described above), or have the key management service 306 itself determine whether the signature is valid (which prevents data leakage of the metric key 302). Alternatively, the policy enforcement service 114 can have the authentication service 142—as part of authentication operations 144—obtain the metric key 302 (e.g., from the key management service 306), determine whether the signature is valid, and return the result of this determination to the policy enforcement service 114. When the dynamic metric value(s) 120 are determined to be authentic, the operations continue as described above with regard to FIG. 1, and when the dynamic metric value(s) 120 are determined not to be authentic, the policy enforcement service 114 performs one or more security actions 136, which can include denying the resource request 134 from being fulfilled and/or sending a response message back to the client 106 indicating that the request is denied (and/or that the dynamic metric value(s) 120 are invalid).

It is also possible for embodiments to use public-private key based encryption techniques. For example, the service provider system could publish a public key that the metric determination engine 118 could use to encrypt a dynamic metric value 120, in which case the service provider system (e.g., policy enforcement service 114, authentication service 142, and/or key management service 306) can use a corresponding private key to decrypt the encrypted dynamic metric value 120. Further, other verification schemes and variants of these schemes can be utilized that are known or easily derived by those of skill in the art.

Figure 4:
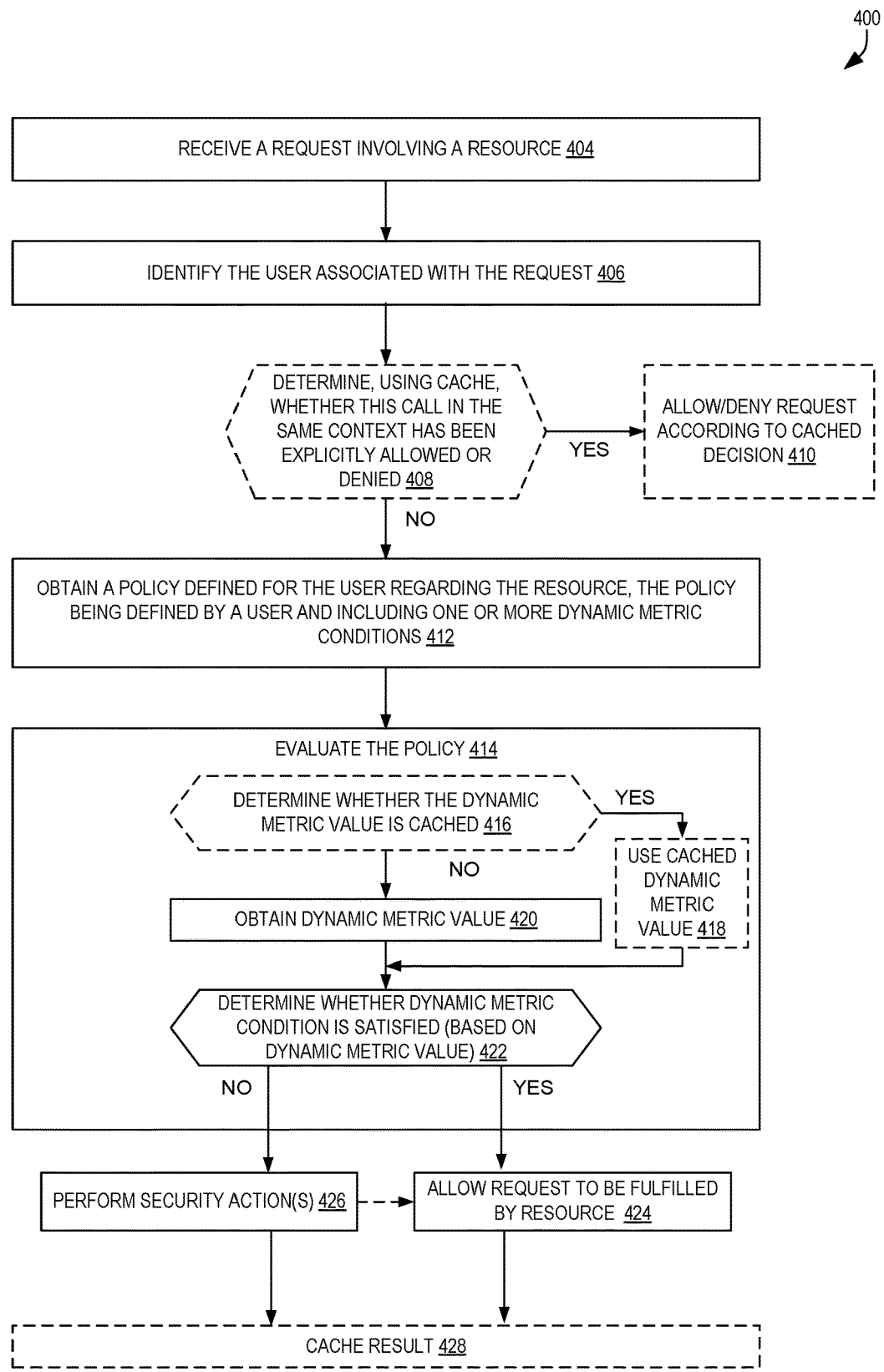
FIG. 4 is a flow diagram illustrating operations for resource protection using metric-based access control policies according to some embodiments.

For additional detail, FIG. 4 is a flow diagram illustrating operations 400 for resource protection using metric-based access control policies according to some embodiments. Some or all of the operations 400 (or any other processes described herein, or variations, and/or combinations thereof—such as operations 500, operations 600, etc.) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising instructions executable by one or more processors. The computer-readable storage medium can be non-transitory. In some embodiments, operations 400 are performed by the policy enforcement service 114 of FIG. 1 or FIG. 3.

The operations 400 include, at block 404, receiving a request involving a resource (e.g., a request to access, modify, manage, etc., the resource). The request can be a HTTP request issued by a client, and the resource could be a compute instance (e.g., a VM), a storage instance (e.g., a file server) or repository, a database, a collection of data, a virtual network, etc. The client may be a software module executed by a client end station that is outside of the service provider network, or could be a software module executed within the service provider network (e.g., by a compute instance). At block 406, the operations 400 include identifying the user associated with the request (e.g., upon whose behalf the request was transmitted). Block 406 can include identifying a user identifier within the request, performing a lookup in a user database using one or more values from the request, etc., to identify a user account of the service provider system.

At decision block 408, the operations 400 optionally include determining, using a cache, whether this call (e.g., the particular type of request) has been made, in a recent amount of time, in the same context, and has been either explicitly allowed or denied. The cache may be specific to the policy enforcement service 114, the resource 124, a collection of resources 124, etc. In some embodiments, block 408 includes determining whether a valid entry exists in a cache indicating a previous result of evaluating a policy, for that user, for a particular type of action indicated by the request involving that resource.

If so, at block 410, the operations 400 include allowing or denying the request according to the cached decision. For example, if the cached decision indicates to deny the request, block 410 can include sending a response message to the client indicating that the request is denied, and prohibiting the request from being fulfilled/served by/for the resource 124.

Otherwise—or in embodiments not utilizing a cache or incorporating block 408—the flow continues to block 412, which includes obtaining a policy defined for the user regarding the resource. The policy was defined by a user (which could be the same user or a different user, e.g., an administrator of the user's organization, another user under a same account) to include one or more dynamic metric conditions. The policy can be obtained by sending a request to a policy management service 108 for any policies corresponding to the user and/or resource and obtaining the policy in a response to the request, or by performing a lookup in a cache 126 to identify the policy, etc. The policy can include one or more policy statements, were a policy statement can include a dynamic metric condition definition.

At block 414, the operations 400 include evaluating the policy. In some embodiments, block 414 optionally includes determining, at block 416, whether the dynamic metric value is cached (e.g., performing a lookup in a cache using a metric identifier value as a key to determine whether a valid cache entry exists for the particular dynamic metric value identified by the dynamic metric condition definition of the policy). If so, at block 418 the cached dynamic metric value can be used, but if not (or if caching is not used), the operations 400 continue with block 420, where the dynamic metric value is obtained—e.g., requesting and thereafter receiving the dynamic metric value from a metric determination engine, reading the dynamic metric value from a data location or database, etc.

With the dynamic metric value, the operations 400 can include decision block 422, and determining whether the dynamic metric condition of the policy is satisfied, which is based on using the dynamic metric value. For example, the dynamic metric value might be compared with a policy-indicated threshold value (e.g., value 206) to determine whether a condition type 202 of the policy is satisfied, though other types of operations may be performed in different use-cases and embodiments as described herein.

When the dynamic metric condition is satisfied, at block 424 the operations 400 can include allowing the request to be fulfilled by the resource; when the dynamic metric condition is not satisfied, at block 426 the operations 400 can include performing one or more security actions, such as blocking the request from being fulfilled (e.g., by the policy enforcement service 114), sending a response message indicating that the request is denied (e.g., by the policy enforcement service 114), notifying an administrator or other user (e.g., by the policy enforcement service 114 issuing a command to a notification service (not illustrated) to provide a notification—e.g., a SMS, email, phone call, etc.—to an administrator or other user), changing an amount of security, monitoring, and/or logging with regard to the resource (e.g., by the policy enforcement service 114 issuing a command to another service of the service provider system, such as the metric determination engine 118 or monitoring service 122), etc. The one or more security actions can even include, in some embodiments, allowing the request to be fulfilled at block 424, though often this action is combined with other security actions (e.g., increasing an amount of monitoring, logging, or security controls).

At block 428, the operations 400 optionally include caching a result of the evaluation of the policy. This operation 400 can allow for other iterations of the operations 400 (e.g., for another request involving the same user, resource, and/or request type) to more quickly identify the necessary response at block 410 due to the decision being quickly found in the cache (as part of block 408) before any policy evaluation (e.g., block 414) would occur.

Figure 5:
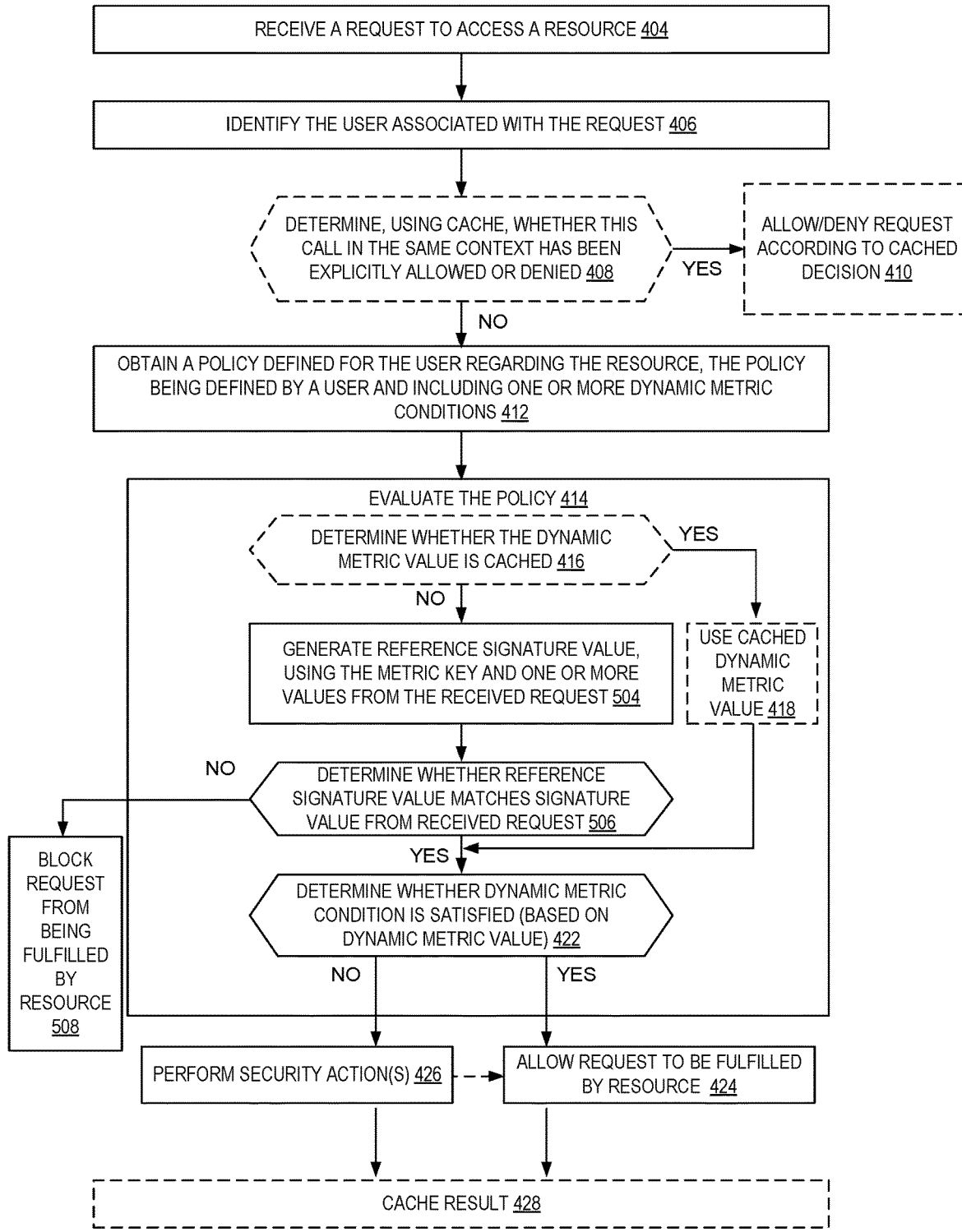
FIG. 5 is a flow diagram illustrating operations for resource protection using metric-based access control policies with client-provided dynamic metric value data according to some embodiments.

Another example flow is shown in FIG. 5, which is a flow diagram illustrating operations 500 for resource protection using metric-based access control policies with client-provided dynamic metric value data according to some embodiments. In some embodiments, operations 500 are performed by the policy enforcement service 114 of FIG. 1 or FIG. 3.

This flow of operations 500 is similar to the flow of operations 400 of FIG. 4; however, this flow differs in that it involves the use of client-provided dynamic metric value(s). Accordingly, the operations 500 for evaluating the policy can be different.

Block 414 optionally includes, at block 416, determining whether the dynamic metric value is cached; if so, the operations 500 can include obtaining the cached dynamic metric value at block 418. If not—or in embodiments where a cache is not utilized in this manner—the operations 500 include, at block 504, generating a reference signature value, using a metric key and one or more values of the received request. In some embodiments, the metric key was provided—directly or indirectly—by a metric determination engine 118, which also used the same metric key to generate a signature (e.g., by encrypting the dynamic metric value(s), perhaps with other information as well). The reference signature value can be generated, for example, by computing a HMAC using some or all of the request as an input value along with a metric key.

At block 506, the operations 500 include determining whether the reference signature value matches a signature value from the received request. Block 506 can include performing a comparison between the reference signature value and the signature value from the received request, which could be a bitwise comparison, etc. When there is no match, the operations 50 may include blocking the request from being fulfilled at block 508. Otherwise, the operations 500 include, at block 422, determining whether the dynamic metric condition of the policy is satisfied, which is based on using the dynamic metric value.

When the dynamic metric condition is satisfied, at block 424 the operations 500 can include allowing the request to be fulfilled by the resource; when the dynamic metric condition is not satisfied, at block 426 the operations 500 can include performing one or more security actions, such as blocking the request from being fulfilled, sending a response message indicating that the request is denied, notifying an administrator or other user, changing an amount of security, monitoring, logging with regard to the resource, etc. The one or more security actions can even include, in some embodiments, allowing the request to be fulfilled at block 424.

At block 428, the operations 500 include caching a result of the evaluation of the policy, which can allow for other iterations of the operations (e.g., for another request involving the same user and/or resource) to terminate at block 410 due to the decision being found in the cache (as part of block 408).

Figure 6:
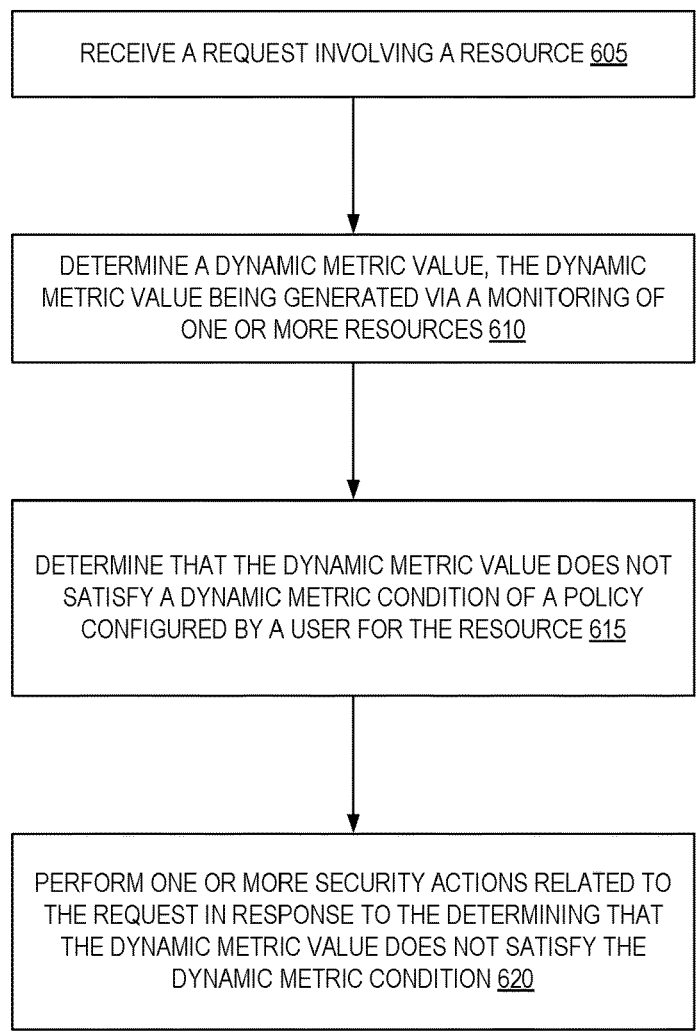
FIG. 6 is a flow diagram illustrating operations for resource protection using metric-based access control policies according to some embodiments.

FIG. 6 is a flow diagram illustrating operations 600 for resource protection using metric-based access control policies according to some embodiments. In some embodiments, operations 600 are performed by the policy enforcement service 114 of FIG. 1 or FIG. 3. The operations 600 include, at block 605, receiving a request involving a resource of an entity. The request can be one or more packets carrying an API request message that is received at an API endpoint. The resource may be one or more compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), storage repositories, databases, applications, etc. The request can be received at an API endpoint of a service provider system.

At block 610, the operations 600 include determining a dynamic metric value, the dynamic metric value having been generated (e.g., by a metric determination engine) via a monitoring of one or more resources. The one or more resources may or may not include the resource. The dynamic metric value, in some embodiments, is a value representing an operational condition of the one or more resources, and may be "dynamic" in that it may change over time. Block 610 can include identifying the dynamic metric value from the request received in block 605, sending a request for the dynamic metric value (e.g., to a metric determination engine 118) and receiving the dynamic metric value in response, performing a lookup in a cache to identify a cached valid entry storing the dynamic metric value, etc. The operations 600 further include, at block 615, determining that the dynamic metric value does not satisfy a dynamic metric condition of a policy configured by the user for the resource. The dynamic metric condition, in some embodiments, defines one or more statements that are to be evaluated using the dynamic metric value. The dynamic metric condition may indicate that the dynamic metric value is to be compared to a user-provided value, and the dynamic metric condition may be satisfied when the dynamic metric value is less than the user-provided value, greater than the user-provided value, etc.

At block 620, the operations 600 further include performing one or more security actions related to the request responsive to the determination that the dynamic metric value does not satisfy the dynamic metric condition. The one or more security actions may include one or more of blocking the request from being fulfilled, sending a response message indicating that the request is denied, notifying an administrator or other user, changing an amount of security, monitoring, logging with regard to the resource, implementing throttling for this requests and/or subsequent requests, etc.

Figure 7:
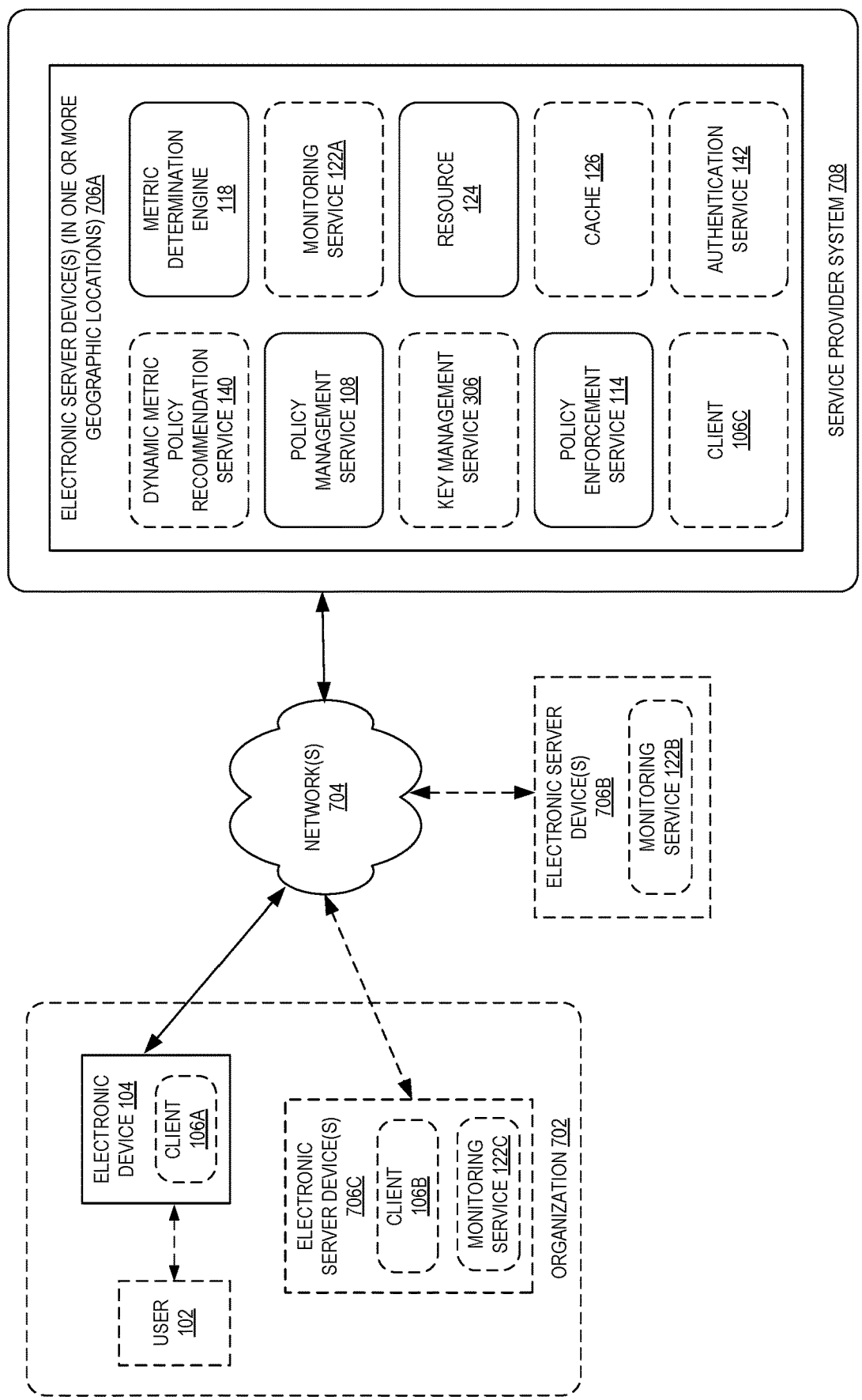
FIG. 7 is a block diagram illustrating example deployment implementations of components for resource protection using metric-based access control policies according to some embodiments.

FIG. 7 is a block diagram illustrating example deployment implementations of components for resource protection using metric-based access control policies according to some embodiments.

In some embodiments, the user 102 may be part of an organization 702 and may operate an electronic device 104 of the organization 702 and/or within a network of the organization 702. The electronic device 104 may be used to issue policy configuration commands 130 and/or resource requests 134 (via client 106A) described herein. The electronic device 104 may be an electronic client device, to be detailed in additional detail later herein.

The organization 702 may further include one or more electronic server devices 706C that implement the client 106B and/or the monitoring service 122C. The one or more electronic server devices 706C may be within an organizational network of the organization 702, or located in a different location and/or operate in a different network.

Devices of the organization 702 may connect via one or more public networks 704 (e.g., the Internet) to the service provider system 708. The service provider system 708 can include one or more electronic server devices 706A, which may be located in multiple geographic locations. The one or more electronic server devices 706A can implement one or more software entities, including but not limited to the metric determination engine 118, the policy management service 108, the resource 124, and the policy enforcement service 114. In some embodiments, the service provider system 708 can also implement one or more of a dynamic metric policy recommendation service 140, a monitoring service 122A, a key management service 306, a cache 126, an authentication service 142, and/or the client 106C (e.g., as software executing on behalf of the user 102 or organization 702, such as within a compute instance). The monitoring service 122 can also be implemented as monitoring service 122B on one or more other electronic server devices 706B, which may be operated by an entity that is different from the service provider and/or organization 702.

Figure 8:
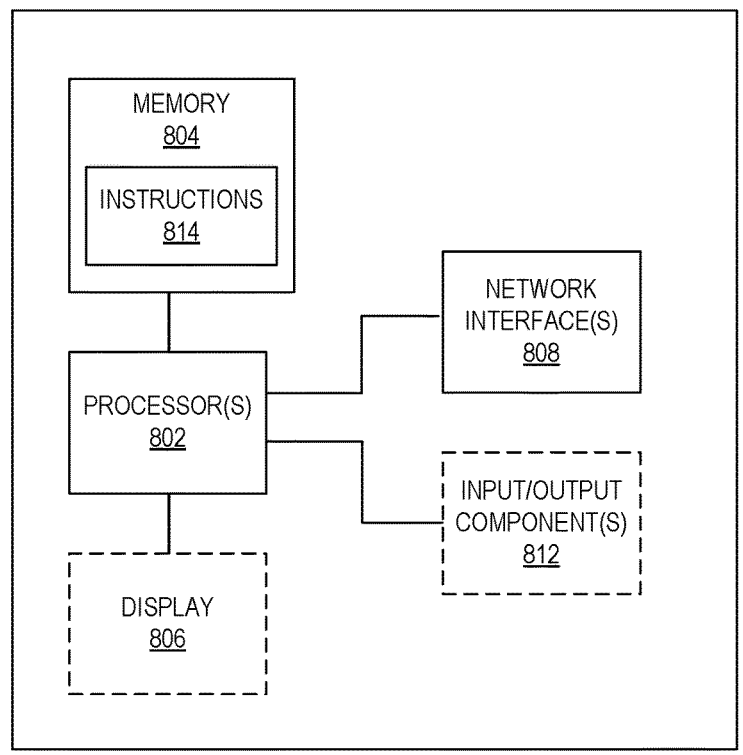
FIG. 8 illustrates a logical arrangement of a set of general components of an exemplary computing device that can be utilized in accordance with various embodiments.

FIG. 8 illustrates a logical arrangement of a set of general components of an example computing device 800 such as electronic device 104, electronic server device(s) 706A/706B/706C, electronic device(s) 920, electronic client device 902, etc. Generally, a computing device 800 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 802 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 804) to store code (e.g., instructions 814) and/or data, and a set of one or more wired or wireless network interfaces 808 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 804) of a given electronic device typically stores code (e.g., instructions 814) for execution on the set of one or more processors 802 of that electronic device. Of course, one or more parts of various embodiments may be implemented using different combinations of software, firmware, and/or hardware.

A computing device 800 can include some type of display element 806, such as a touch screen or liquid crystal display (LCD), although many devices such as portable media players might convey information via other means, such as through audio speakers, and other types of devices such as server end stations may not have a display element 806 at all. As discussed, the device in many embodiments can include at least one input and/or output component(s) 812 able to receive input from a user. This input component can include, for example, a push button, touch pad, touch screen, wheel, joystick, keyboard, mouse, keypad, or any other such device or element whereby a user can input a command to the device. In some embodiments, however, such a device might be controlled through a combination of visual and/or audio commands and utilize a microphone, camera, sensor, etc., such that a user can control the device without having to be in physical contact with the device.

Figure 9:
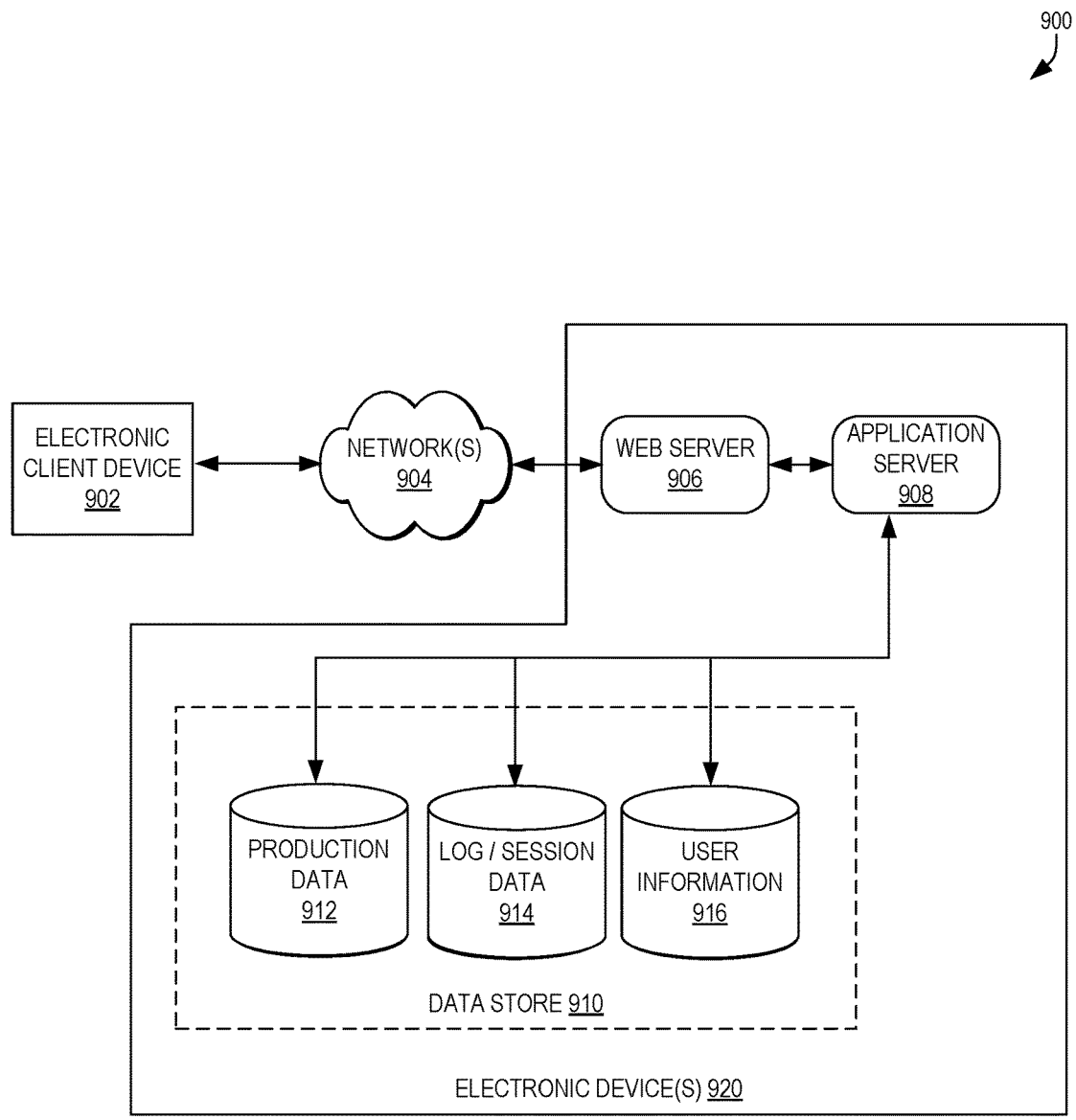
FIG. 9 illustrates an example of an environment for implementing aspects in accordance with various embodiments.

As discussed, different approaches can be implemented in various environments in accordance with the described embodiments. For example, FIG. 9 illustrates an example of an environment 900 for implementing aspects in accordance with various embodiments. For example, in some embodiments the policy configuration commands 130 and/or resource request 134 are HTTP requests that are received by a web server (e.g., web server 906), and the user 102 via electronic device 104 may interact with the service provider system 708 (e.g., to define and manage policies and/or resources) via a web portal provided via the web server 906 and application server 908. As will be appreciated, although a web-based environment is used for purposes of explanation, different environments may be used, as appropriate, to implement various embodiments. The environment includes an electronic client device 902 (e.g., electronic device 104), which may also be referred to as a client end station and can be any appropriate device operable to send and receive requests, messages or information over an appropriate network 904 (e.g., network(s) 704) and convey information back to a user of the device 902. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 904 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 904 includes the Internet, as the environment includes a web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device 902 and handling a majority of the data access and business logic for an application. The application server 908 provides access control services in cooperation with the data store 910 and is able to generate content such as text, graphics, audio, video, etc., to be transferred to the client device 902, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 902 and the application server 908, can be handled by the web server 906. It should be understood that the web server 906 and application server 908 are not required and are merely example components, as structured code discussed herein can be executed on any appropriate device or host machine as discussed elsewhere herein.

The data store 910 can include several separate data tables, databases, or other data storage mechanisms and media for storing data relating to a particular aspect. For example, the data store illustrated includes mechanisms for storing production data 912 and user information 916, which can be used to serve content for the production side. The data store 910 also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update, or otherwise process data in response thereto. In one example, a user might submit a search request for a certain type of item. In this case, the data store 910 might access the user information 916 to verify the identity of the user and can access a production data 912 to obtain information about items of that type. The information can then be returned to the user, such as in a listing of results on a web page that the user is able to view via a browser on the user device 902. Information for a particular item of interest can be viewed in a dedicated page or window of the browser.

The web server 906, application server 908, and/or data store 910 may be implemented by one or more electronic devices 920, which can also be referred to as electronic server devices or server end stations, and may or may not be located in different geographic locations. Each of the one or more electronic devices 920 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the environment 900 in FIG. 9 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network, a wide-area network, a virtual private network, the Internet, an intranet, an extranet, a public switched telephone network, an infrared network, a wireless network, and any combination thereof.

In embodiments utilizing a web server, the web server can run any of a variety of server or mid-tier applications, including HTTP servers, FTP servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving, by a service provider system from an electronic device of a user of an entity, a policy configuration command indicating a request to implement a policy for authorizing requests involving a resource of the entity, the policy to include a dynamic metric condition which, when evaluated, indicates whether a request involving the resource is to be authorized, the dynamic metric condition utilizing a dynamic metric value that is generated via an external monitoring of one or more resources of the entity, the entity connected via a network to the service provider system, the dynamic metric value representing an amount of anomalous behavior associated with at least one of the one or more resources of the entity, and the policy configuration command indicating a threshold value for the amount of anomalous behavior, the threshold value selected by the user of the entity;
receiving, by the service provider system, the request involving the resource, the request involving the resource including the dynamic metric value and a received signature value;
obtaining a metric key;
determining that the dynamic metric value is legitimate, the determining including:
generating a reference signature value using at least the metric key and the dynamic metric value, and
determining that the reference signature value matches the received signature value;
determining, by the service provider system, that the dynamic metric value does not satisfy the dynamic metric condition, the determining including comparing the dynamic metric value to the threshold value for the amount of anomalous behavior; and
performing, by the service provider system, one or more security actions related to the request involving the resource in response to the determining that the dynamic metric value does not satisfy the dynamic metric condition, the one or more security actions including blocking the request involving the resource from being fulfilled.

2. The computer-implemented method of claim 1, wherein the external monitoring of the one or more resources of the entity includes external monitoring of the resource.

3. A computer-implemented method comprising:
receiving, from an electronic device of a user, a policy configuration command indicating a request to implement a policy for authorizing requests involving a resource, the policy configuration command identifying an anomalous activity threshold value selected by the user for the resource;
receiving, by a service provider system, a request involving the resource, the request involving the resource originating from an entity connected via a network to the service provider system, the request involving the resource including a received signature value;
obtaining a metric key;
determining, by the service provider system, a dynamic metric value, the dynamic metric value being generated via a monitoring of one or more resources, the dynamic metric value representing an amount of anomalous activity associated with the one or more resources;
determining that the dynamic metric value is legitimate, the determining including:
generating a reference signature value using at least the metric key and the dynamic metric value, and
determining that the reference signature value matches the received signature value;
determining, by the service provider system, that the dynamic metric value does not satisfy a dynamic metric condition of the policy, the determining including comparing the dynamic metric value to the anomalous activity threshold value; and
performing, by the service provider system, one or more security actions related to the request involving the resource in response to the determining that the dynamic metric value does not satisfy the dynamic metric condition.

4. The computer-implemented method of claim 3, further comprising:
receiving a second request involving the resource;
determining a second dynamic metric value for the resource, wherein the second dynamic metric value is different than the dynamic metric value;
determining that the second dynamic metric value does satisfy the dynamic metric condition, the determining including comparing the second dynamic metric value to the anomalous activity threshold value; and
causing the second request to be fulfilled in response to the determining that the second dynamic metric value does satisfy the dynamic metric condition.

5. The computer-implemented method of claim 3, wherein the policy further defines a second dynamic policy condition, and wherein the method further comprises:
determining a second dynamic metric value for the resource, wherein the second dynamic metric value satisfies the second dynamic policy condition, the determining including comparing the second dynamic metric value to a second anomalous activity threshold value, the second dynamic policy condition indicating the second anomalous activity threshold value.

6. The computer-implemented method of claim 3, further comprising:
providing, to the user, one or more suggested dynamic metric conditions determined based on previous activity involving the one or more resources.

7. The computer-implemented method of claim 3, wherein the one or more security actions include causing a multi-factor authentication process to be enabled.

8. The computer-implemented method of claim 3, further comprising:
determining that the dynamic metric value is likely to be needed in an upcoming window of time based at least on an analysis of historic activity involving the resource;
prefetching the dynamic metric value before the receiving of the request involving the resource; and
storing the dynamic metric value in a cache, wherein determining the dynamic metric value comprises performing a lookup in the cache to identify the dynamic metric value.

9. The computer-implemented method of claim 3, wherein determining the dynamic metric value comprises:
determining that the request involving the resource does not include the dynamic metric value or that the dynamic metric value is not legitimate;

sending a request for the dynamic metric value; and
receiving a response to the request for the dynamic metric value, the response including the dynamic metric value.

10. The computer-implemented method of claim 3, further comprising:
receiving, at an Application Programming Interface (API) endpoint of the service provider system, a request to enforce the policy including the dynamic metric condition; and
applying the policy within the service provider system.

11. The computer-implemented method of claim 6, wherein the one or more suggested dynamic metric conditions comprise the anomalous activity threshold value, the anomalous activity threshold value based on one or more historic dynamic metric values.

12. A system comprising:
an application server device comprising:
a policy management service, the policy management service to receive, from an electronic device of a user, a policy configuration command indicating a request to implement a policy for authorizing requests involving a resource, the policy configuration command identifying an anomalous activity threshold value selected by the user for the resource;
a metric determination engine to generate a dynamic metric value based on a monitoring of one or more resources that are distinct from the metric determination engine, wherein the dynamic metric value represents an amount of anomalous behavior associated with the one or more resources, and
a policy enforcement service implemented by one or more electronic devices to:
receive a request involving the resource, the request involving the resource including a received signature value;
obtain a metric key;
determine the dynamic metric value, the dynamic metric value having been generated by the metric determination engine;
determine that the dynamic metric value is legitimate, wherein to determine the dynamic metric value is legitimate, the policy enforcement service is to:
generate a reference signature value using at least the metric key and the dynamic metric value, and
determine that the reference signature value matches the received signature value;
determine that the dynamic metric value does not satisfy a dynamic metric condition of the policy, wherein to determine that the dynamic metric value does not satisfy the dynamic metric condition of the policy, the policy enforcement service is to compare the dynamic metric value to the anomalous activity threshold value; and
perform one or more security actions related to the request involving the resource in response to the determination that the dynamic metric value does not satisfy the dynamic metric condition; and
a data store to store the resource.

13. The system of claim 12, wherein the request involving the resource includes the dynamic metric value.

14. The system of claim 12, wherein the policy enforcement service is further to:
determine that the dynamic metric value is likely to be needed in an upcoming window of time based at least on an analysis of historic activity involving the resource;
prefetch the dynamic metric value; and
store the dynamic metric value in a cache, wherein the policy enforcement service, to determine the dynamic metric value, is to perform a lookup in the cache to identify the dynamic metric value.

\* \* \* \* \*